UNITED STATES PATENT OFFICE.

PETER STUART, OF EDINBURGH, COUNTY OF MID LOTHIAN, SCOTLAND.

MANUFACTURE AND LAYING OF COMPOSITE PAVEMENTS.

SPECIFICATION forming part of Letters Patent No. 259,059, dated June 6, 1882.

Application filed November 28, 1881. (No specimens.)

*To all whom it may concern:*

Be it known that I, PETER STUART, a citizen of the United Kingdom of Great Britain and Ireland, residing at Edinburgh, in the county of Mid-Lothian, North Britain, have invented an Improvement in the Manufacture and Laying of Composite Pavements, Floors, Platforms, Landings, Stair-Steps, and the like, and in composition therefor, of which the following is a specification.

In the manufacture of composite pavements containing a proportion of cement and of broken or granulated rock it has hitherto been customary to use the ordinary Portland, Roman, or similar cement of commerce in combination with whatever stones were available in the locality, and to finish off with a wearing-surface composition of sand and cement. Owing to the unreliable character of the materials used, it has been found that the pavements have cracked and been otherwise seriously affected by atmospheric influences, and have worn unevenly on the surface.

Under this invention, to obviate these defects and to produce a pavement which will stand a much higher breaking strain, and be more solid and durable as well as wear more evenly on the upper or wearing surface, I specially select the materials I employ; and, first, I preferably employ a cement of the first quality, obtained by carefully selecting and grinding only such of the admixed clay and chalk as has been thoroughly calcined, and rejecting such as has not been so completely calcined in the process of manufacture; second, with the cement I mix crushed granite, because I find that there is a particular affinity between granite and cement, due to the absorbent and binding action of the mica present in the granite, and with the object of clearing the faces of the crystals and exposing the laminæ of the mica to the action of the cement, I carefully remove the fine dust or flour resulting from the crushing operation either by sifting, washing, or otherwise. As previously stated, I thereby find that the breaking and crushing strain and the durability of the pavement is greatly increased.

In the improved pavement this composition constitutes the wearing-surface, and I apply it on the top of the layer of ordinary concrete usually employed in laying composite pavements instead of the composition of cement and sand smoothed, floated, or "troweled" into the surface, as hitherto practiced.

In laying a pavement according to this invention, the ground is first excavated to a depth of seven inches, or other depth, according to the strength required or nature of the ground. A layer of stone or other equivalent material, broken or sized to pass through a two-and-a-half-inch ring and free from sand or other earthy matter, is spread level in the excavation to a depth of three inches, or thereabout, and on the stones a layer of concrete is spread, the said layer being composed in the ordinary method of making concrete.

Previous to laying down the concrete the bed of stones is divided or pinned off into squares, varying from three to twenty feet, according to the size of slabs it is desired to produce, and in constructing the pavement the concrete is first laid to a depth of two inches or other depth, according to the strength required, on alternate squares, both as regards the length and breadth of the pavement, and it is then leveled with a straight-edge, and thereafter rolled or beat flat and compressed by a heavy roller or beater. Wooden battens or rods are then laid on the top of the concrete around the four sides of each square, and in the space inclosed by the said rods the hereinbefore-specified composition of granite and cement is laid to a thickness of two inches, or other thickness corresponding to the strength of pavement required. When the alternate squares have set sufficiently hard the wooden battens or rods are removed from around them, thereby leaving the under layer of concrete projecting beyond the upper layer of granite composition. The edges of the concrete are then cut beveled or straight down, but still projecting, and the other alternate or intermediate squares are then filled in with concrete and granite compositions, as hereinbefore described. When the whole pavement has set the surface is painted over with a coating of silicate of soda or clear water; and if it is desired to color the surface ground or pulverized hematite or other iron ore or coloringmatter may also be used, as set forth in the specification of my former Letters Patent, No. 248,526, granted 18th October, 1881.

In making the improved paving composition hereinbefore described, and which I call "Granolithic," the granite is cubed to a size of half an inch and under, and freed from the flour or dust resulting from the granulating process. It is then mixed with the cement and the mixture sifted through a half-inch sieve, after which the components are thoroughly amalgamated in a steam or hand pug-mill or by hand-labor, a sufficient quantity of water being added to render the whole plastic. The constituents may be amalgamated in various proportions. I have obtained good results with two parts of granite to from one to one and a quarter part of cement, and with three parts of granite to two of cement.

The improved composition, besides being used in laying pavements, floors, and platforms, may also be employed in the manufacture of stair-steps, landings, and like structures by molding it in suitable molds.

I am aware that pavements have been before made with a sub-bed of concrete laid in blocks, separated from each other by strips of paper, to prevent cracking of the blocks due to changes of temperature, and with a surface-bed of cement having broken stones embedded in its surface. The above-described method was, before my invention, the only known expedient for effectively preventing cracking of the pavement due to changes of temperature. I have, however, discovered—and the application of this discovery constitutes one of the principal features of my invention—that granite, by reason of the mica forming part of its composition, forms with cement or other binding material an artificial stone that can be laid in any sized sheets and stand a temperature of zero without cracking. I am also aware that walking-surfaces have been made of crushed stone or other hard and sharp substances, partially embedded in the surface of blocks of cement or concrete, or of pieces of stone scattered over a bedding of concrete and pressed into the same, to form a solid pavement by ramming or rolling; but neither of these two methods has ever been put to practical test, so far as I am aware, and at any event are entirely distinct from my method of making a pavement by thoroughly amalgamating granite broken or divided into small pieces and a suitable binding material in a pug-mill or otherwise, so as to reduce the mixture to a practically homogeneous mass, and then applying this mass, so amalgamated, in blocks or layers, as a wearing-surface for pavements and other structures.

It has also been proposed, before my present invention, to use broken granite or other small pieces of stone mixed with cement or asphalt for paving purposes; but pavements so formed were always ineffective, and liable to destruction by moisture and cold. The loose dust or flour always gathered on the faces of the crystals of the stone serves to effectually keep the binding material from obtaining a firm grasp thereon. My granolithic pavement is made of granite, cubed or broken, and mixed with cement or other suitable binding material, the stone before being mixed with the cement being thoroughly cleaned, so as to present the solid and smooth faces of the crystals for the adhesion of the cement.

Having fully described the invention, what it is desired to claim and secure by Letters Patent is—

1. The composition for pavements, landings, stair-steps, and other like structures, consisting of a mixture of cement or other binding material and broken or cubed granite, thoroughly cleaned to present the solid smooth faces of its crystals, the mixture being thoroughly amalgamated before application as a wearing-surface, substantially as set forth.

2. The method of making artificial stone for pavements and other structures, which consists in crushing or otherwise reducing granite to small pieces or cubes, removing therefrom the fine dust or flour resulting from this operation, so as to present the clean faces of the crystals, adding thereto a suitable quantity of cement or other binding material, thoroughly amalgamating the mixture in a pug-mill or otherwise, and molding or applying the same as a wearing-surface, substantially as and for the purpose set forth.

PETER STUART. [L. S.]

Witnesses:
  JOHN EDGAR POYNTER,
    8 *Prince's Sqr., Glasgow.*
  GEO. MACAULAY-CRUIKSHANK,
    135 *Buchanan St., Glasgow.*